Patented Jan. 6, 1942

2,269,134

UNITED STATES PATENT OFFICE 2,269,134

DESALTING AND DEMULSIFYING COMPOUND FOR PETROLEUM EMULSIONS

Paul T. Tarnoski, Oak Park, and Elwood H. Uhlmann, Evanston, Ill.

No Drawing. Application June 2, 1939,
Serial No. 277,030

5 Claims. (Cl. 252—335)

This invention relates to a compound for treating petroleum and more particularly to a compound for treating emulsions of petroleum and brine for the purpose of separating the salt and water from the petroleum.

Emulsions of crude petroleum and water, and particularly emulsions of crude petroleum and salt water, when heretofore demulsified, showed appreciable amounts of salt remaining in the demulsified petroleum. The amount of salt left in the petroleum in any particular instance varied from a bare trace to as much as 0.25 percent. Although the water had been eliminated from the crude petroleum, there would remain an impurity which, in many cases, caused far more trouble in the refineries than water. The salt being in solid form forms a scale in the stills which builds up, interfering with heat interchange, clogs up piping, and eventually must be removed, causing serious loss of production due to shut-downs.

The salt in the crude petroleum is in the form of microscopic crystals which are turned out of solution from saturated salt brines, when the brines cool to atmospheric temperatures. These microscopic salt crystals occur in the oil film surrounding the drops of brine in the petroleum emulsion and do not dissolve when the petroleum emulsion is broken down by the well known demulsifying agents commonly available in the industry. The salt is carried into the petroleum and exists therein in solid form.

The purpose of our invention is to enable the operator to use a chemical combination which eliminates the salt from the crude petroleum and carries it away by dissolving the salt, due to the composition of the chemicals which are used. The combination of chemicals used exposes the salt to the action of water, and by allowing the water to wet the salt, the salt is instantly dissolved owing to the microscopic size of the crystals of salt carried in the crude petroleum.

The action of the combination of chemicals used to de-salt the crude petroleum and the formula for the same are described below:

We have found that when two substances, which are both soluble in each other, and which are also soluble in water and petroleum, are mixed together in various proportions, and added to emulsions of crude petroleum and salt brines, being mixed therein thoroughly and intimately and treated with water, the crude petroleum will be free of salt when the layers of petroleum and brine have settled out.

The chemicals used are ketone bodies which are mutually soluble in water and petroleum, such as acetone, ethyl, methyl ketone, ethyl ketone, etc., or any ketone body which is soluble both in water and petroleum. This ketone body is dissolved in a sulfonated fatty acid, or sulfonated fatty oil, or a sulfonated petroleum residue, or sulfuric acid sludge resulting from the treatment of petroleum in the refining process, or any sulfonated body soluble both in water and petroleum.

The mixture is introduced into the crude petroleum in the proportion of from one gallon per 100 bbls. to one gallon per 500 bbls. of crude petroleum. Some water may be added. The crude petroleum, the chemicals and the water are thoroughly and intimately mixed. When the layers of petroleum and water substance have separated, the water layer will contain the salt and it will be found that the petroleum is free of salt.

In the case of heavy petroleums, heating may be found necessary to effect good separation. However, if time is not a factor, the petroleum can be treated without heat.

We have found that it is not necessary to demulsify the petroleum first and then treat with the above compound again in order to remove the salt. The operation of de-salting and demulsification can be carried out in one step by adding water. The addition of water is necessary where the water phase consists of a saturated brine solution. In certain cases, the addition of water is unnecessary, due to the fact that the brine is not saturated.

We have found that complete removal of the salt is not effected by the use of the well known demulsifying agents that are commercially available at the present time.

The novel feature of this invention is based upon the mutual solubility, or more correctly speaking, the common solubility of all materials, viz., petroleum, ketone and sulfonated compound. The action which takes place exposes the salt crystals to the action of water to a far greater degree than has been devised heretofore. The salt, being coated with the film of petroleum, is insulated from the action of water until the compound is introduced into the petroleum, and the action of the ketone bodies together with that of the sulfonated bodies breaks the film of oil and allows the water to wet the microscopic salt crystals dissolving them instantly.

Specific examples of the treatment will be found in the use of a compound consisting of 33% of sulfonated fatty acid and 67% of methyl ketone or acetone, which, when mixed and introduced into the emulsion of petroleum and water before any demulsifying treatment is effected, will remove substantially 66⅔% of the salt. In one type of crude, which we treated with this compound, from thirty to fifty pounds of salt were found to be present in each hundred barrels of crude. When each hundred barrels of this crude were treated with one gallon of our compound, from twenty to thirty-three and one-third pounds of salt were removed. After the separation of the petroleum and water, the remaining salt in the petroleum was removed by a subsequent treatment with this compound, a slight amount of water being added this time, but not exceeding 4% by volume of the petroleum treated. The salt being coated by the film of petroleum and insulated from the action of water, the ketone bodies and sulfonated bodies break the film of oil and allow the water to wet the microscopic salt crystals, dissolving them instantly. Hence, if the petroleum is treated after the water is separated out, some water must be added to the ketone and sulfonated bodies. If the petroleum is treated by our compound before demulsification, water must be added only where the water phase consists of a saturated brine solution.

We have found that the amount of compound used will depend somewhat upon the character of the crude treated. To illustrate, in one commercial use, only one and one-half gallons of our compound were required to treat nine thousand barrels of crude in order to accomplish the results above stated. Moreover, the proportions of the ketone bodies and the sulfonated bodies used in the compound may vary as the result of the type of crude treated. In certain instances, it has been found advisable to use equal parts of ketones and sulfonates or to vary the proportions so that the ketones would vary from 33% to 50% and the sulfonates from 67% to 50%. It will be quite apparent that the type of crude treated will determine the proportions and the amounts used.

Without further elaboration, the foregoing will so fully explain the gist of our invention that others may, by applying current knowledge, readily adopt the same for use under varying conditions of service, without eliminating certain features, which may properly be said to constitute the essential items of novelty involved, which items are intended to be defined and secured to us by the following claims.

We claim:

1. A de-salting and a demulsifying compound for treating emulsions of petroleum and water consisting of a ketone soluble in water and petroleum, and a sulfonated fatty acid.

2. A de-salting and a demulsifying compound for treating crude petroleums consisting of a ketone body mutually soluble in water and petroleum, and a sulfonated fat.

3. A de-salting and a demulsifying compound for treating crude petroleum consisting of a ketone body and a sulfonated body, both mutually soluble in water and petroleum.

4. A demulsifying compound for treating emulsions of petroleum and brine to separate the salt and the water from the petroleum comprising a ketone body and a sulfonated body, both miscible in all proportions with each other and soluble in the water and petroleum.

5. A process for treating emulsions of petroleum and brine characterized by subjecting the emulsion to the action of a solution comprising a ketone and a sulfonated body both soluble in water and petroleum, and the addition of water in proportion to the density of the brine.

PAUL T. TARNOSKI.
ELWOOD H. UHLMANN.